(12) United States Patent
Dill et al.

(10) Patent No.: US 6,202,710 B1
(45) Date of Patent: Mar. 20, 2001

(54) METHOD AND APPARATUS FOR REFUELING AN ELECTROCHEMICAL ENGINE

(75) Inventors: Norm Dill, Walworth; Michael A. Stratton, Rochester; James V. McManis, Batavia; Daniel B. O'Connell, Rochester, all of NY (US); Jonas Bereisa, Bloomfield Hills, MI (US)

(73) Assignee: General Motors Corporation, Detriot, MI (US)

( * ) Notice: Subject to any disclaimer, the term of this patent is extended or adjusted under 35 U.S.C. 154(b) by 0 days.

(21) Appl. No.: 09/478,673

(22) Filed: Jan. 6, 2000

(51) Int. Cl.[7] ..................................................... B65B 1/04
(52) U.S. Cl. ........................... 141/94; 141/197; 141/285; 220/86.2
(58) Field of Search ................................. 141/197, 94, 2, 141/4, 8, 285, 290, 98; 220/86.2

(56) References Cited

U.S. PATENT DOCUMENTS 5,488,978 * 2/1996 Kountz et al. ............................ 141/4
5,701,928 * 12/1997 Aoki ..................................... 141/98

* cited by examiner

Primary Examiner—Steven O. Douglas
(74) Attorney, Agent, or Firm—Laura C. Wideman (57) ABSTRACT

A method and apparatus for refueling a vehicle powered by an electrochemical engine comprises a fuel fill pocket accessible to the exterior of the vehicle and having an interior end with an opening to a hydrogen refueling line. The hydrogen refueling line extends between the fuel fill pocket and a storage tank in the engine. A fuel fill door conceals the fuel fill pocket when closed and operates to open for access to the fuel fill pocket. A nozzle is operably connected to a refueling station and is slideably receivable within the fuel fill pocket. The nozzle has a hydrogen input line. The refueling apparatus has a flow communication means to ensure the hydrogen input line is in flow communication with the hydrogen refueling line for delivering hydrogen. Mating communication ports in the nozzle and the fuel fill pocket operate to send and receive electronic signals therebetween and to a controller for controlling the operation of refueling. The controller ensures that the nozzle is properly inserted before initiating refueling and verifies that line pressures are below a minimum set level before the nozzle may be removed from the fuel fill pocket.

14 Claims, 5 Drawing Sheets

METHOD AND APPARATUS FOR REFUELING AN ELECTROCHEMICAL ENGINE

TECHNICAL FIELD

The present invention relates to a method and apparatus for refueling an electrochemical engine.

BACKGROUND OF THE INVENTION

As fuel cell power plants are being integrated into useable vehicles, developing efficient ways of supplying the fuel needed to operate the fuel cell stack becomes more critical. Hydrogen gas is the common fuel input to the stack. It may be reformed on-board a vehicle by processing fuels such as gasoline or methanol through a reformer to convert the fuel to reformate comprising hydrogen, carbon dioxide, carbon monoxide, and water vapor. The reformate may be passed through a shift converter and gas purifiers to remove carbon monoxide before delivering the hydrogen to the fuel cell stack. This complete reformation process is not only complex to engineer, but consumes valuable packaging space and mass.

As an alternative to reforming fuels on-board, hydrogen gas may be stored on-board in suitable tanks. While pure hydrogen gas is an efficient fuel, storing it on-board a vehicle has drawbacks related to packaging and mass. Instead of storing hydrogen in its gaseous state, hydrogen may be taken-up and captured by a hydrogen-retention material contained within an on-board storage tank. With either of these storage methods, the storage tank will need to be refilled with hydrogen gas by a typical consumer at a refueling station. This presents challenges for the interface between the refueling station and the vehicle.

SUMMARY OF THE INVENTION

The present invention provides a controllable refueling method and apparatus for refueling a vehicle powered by an electrochemical engine with hydrogen gas. The refueling apparatus is particularly useful for an electrochemical engine which stores hydrogen in an on-board storage tank, either in its gaseous state or captured by a hydrogen-retention material.

The refueling apparatus may comprise a fuel fill pocket accessible to the exterior of the vehicle which has an interior end with pocket passages for delivering hydrogen gas to the on-board storage tank and for circulating cooled pre-refueling coolant from a refueling station through the storage tank and back to the refueling station. A fuel fill door conceals the fuel fill pocket when closed and has an unlocking feature.

A nozzle is operably connected to the refueling station and is slideably receivable within the fuel fill pocket. The nozzle has nozzle passages complementary to the pocket passages. It also has a companion unlocking feature, which operates in conjunction with the fuel fill door unlocking feature by unlocking the fuel fill door when the nozzle is placed adjacent to the fill door. The unlocking features ensure that the pocket passages to the engine are not contaminated.

The refueling apparatus may further include a flow communication means to ensure the nozzle passages are in flow communication with the pocket passages. The flow communication means may take many forms which limit how the nozzle may be inserted in the fuel fill pocket or it may include an annular connecting passage about the nozzle which provides flow communication between the nozzle and pocket passages regardless of the orientation of the nozzle to the pocket. The flow communication means removes the risk of misaligning complementary passages.

The refueling apparatus may also include an interlocking means for securing the nozzle in the fuel fill pocket when the nozzle is fully inserted therein. This feature prevents inadvertent removal of the nozzle while hydrogen or pre-refueling coolant is flowing therethrough.

Mating communication ports may be provided for the nozzle and the fuel fill pocket, which operate to send and receive electronic signals therebetween and to a controller for controlling the operation of refueling. The controller may verify that the nozzle is properly inserted in the pocket through a sensor on the interlocking means. It may also prevent disengagement of the interlocking means while there is flow between the nozzle and pocket passages.

The present invention is particularly useful for a vehicle having a storage tank containing hydrogen-retention material for capturing and storing hydrogen. Prior to refueling the storage tank, pre-refueling coolant may be circulated from the nozzle, through the storage tank, and back to the nozzle for cooling the storage tank to a temperature where the hydrogen-retention material operates to take-up hydrogen. Once the controller verifies that the storage tank is sufficiently cooled, it stops the coolant circulation and initiates hydrogen refueling.

DESCRIPTION OF THE PREFERRED EMBODIMENT

Figure 1:
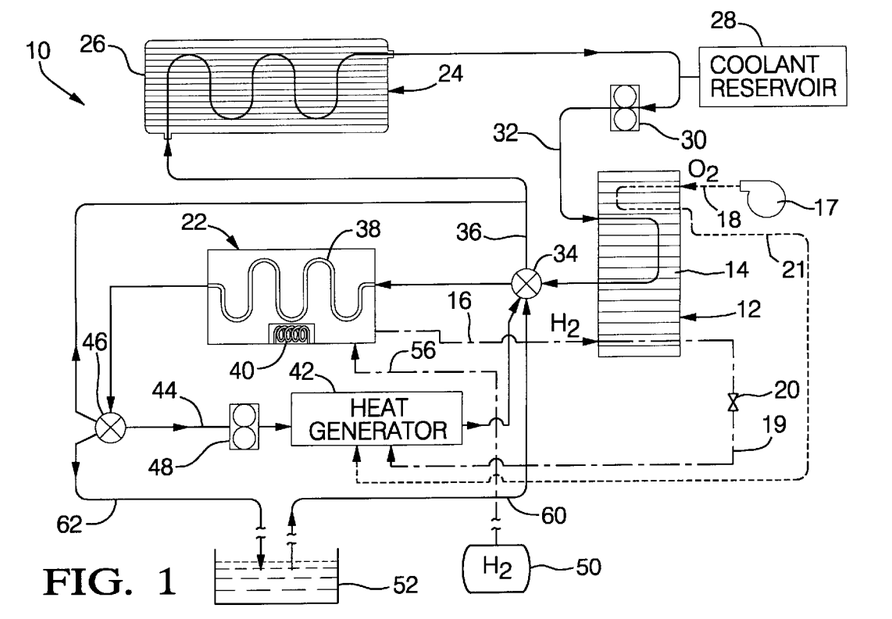
FIG. 1 is a schematic illustration of an electrochemical engine to be refueled using the present invention.

An electrochemical engine (ECE), shown generally as 10 in FIG. 1, generates electricity to power vehicle accessories or a drive system for propelling a vehicle. Electricity is generated by a known electrochemical reaction between hydrogen and oxygen within a fuel cell stack 12. The fuel cell stack 12 comprises a series of individual fuel cells 14, as is known in the art. Hydrogen gas is fed through a hydrogen delivery line 16 to the anode side of the stack 12. An air generator 17, which may include a compressor and a humidifier, supplies humidified oxidant through an oxidant line 18 to the cathode of the fuel cell stack 12. The cathode is separated from the anode by an electrolyte. Electricity and heat are generated in the fuel cell stack 12. An exhaust valve 20 from the anode side to a hydrogen exhaust line 19 is generally closed such that all the hydrogen is consumed in the fuel cell stack 12, but is operable to open and release unconsumed hydrogen. By-products of the cathode, including nitrogen and unconsumed oxygen are exhausted through a cathode exhaust line 21.

Hydrogen, for fueling the electrochemical process in the fuel cell stack 12, is stored in a storage tank 22 in the ECE 10. In a first preferred embodiment, the storage tank 22 contains "hydrogen-retention material", not shown. By this, it is meant a material which is capable of reversibly taking-up and storing hydrogen at a hydrogen-storage temperature, and releasing it at a release temperature, which is greater than the hydrogen-storage temperature. The hydrogen-retention material may comprise a metal, such as sodium-aluminum, lanthanum-nickelide, titanium, or nickel, which reacts with and stores the hydrogen as a hydride of the metal. A particularly preferred such metal comprises sodium-aluminum, which has a release temperature for most of its retained hydrogen at or near the operating temperature of the fuel cell stack 12. This allows by-product heat from the fuel cell stack 12 to be used to release the hydrogen from the hydride.

As a second example, the "hydrogen-retention material" comprises a hydrogen adsorbent which reversibly adsorbs hydrogen at a hydrogen-storage temperature and desorbs it at a release temperature greater than the hydrogen-storage temperature. A preferred such adsorbent comprises carbon nanofibers, although any high volume storage adsorbent may suffice. With either type of hydrogen-retention material, heating the storage tank 22 releases hydrogen gas which is supplied through the hydrogen delivery line 16 to the electrochemical reaction in the fuel cell stack 12 as discussed above.

The ECE 10 further includes a thermal management system 24 including a radiator 26, a coolant reservoir 28, a primary coolant pump 30 and a primary coolant flow circuit 32 to circulate coolant throughout the engine. The primary coolant flow circuit 32 extends from the coolant reservoir 28, through the primary coolant pump 30, the fuel cell stack 12, the storage tank 22, the radiator 26, and back to the coolant reservoir 28. A coolant-distribution valve 34 is interposed between the fuel cell stack 12 and the storage tank 22 along the primary coolant flow circuit 32. A bypass coolant flow line 36 extends from the distribution valve 34 to the radiator 26.

The primary coolant flow circuit 32 delivers low temperature coolant to the fuel cell stack 12 to transfer the heat by-product out of the stack and deliver it to the storage tank 22. The storage tank 22 contains conduits 38 (e.g. coils) through which the heated coolant is circulated to heat the hydrogen-retention material. Heated coolant may also bypass the storage tank 22 and be delivered directly to the radiator 26 via the bypass coolant flow line 36 from the coolant-distribution valve 34. The coolant-distribution valve 34 is operable to direct heated coolant from the fuel cell stack 12 to either or both the storage tank 22 or the radiator 26.

To initiate ECE start-up, an electric heating element 40 may be provided in, or adjacent to, the storage tank 22 for providing initial electrically-generated heat to the hydrogen-retention material for releasing hydrogen gas to fuel the fuel cell stack 12. The heating element 40 need only operate for a short period of time until the ECE 10 becomes self-sustaining, meaning the fuel cell stack 12 is producing enough heat to release hydrogen from the storage tank 22 to fuel the stack. Therefore, the parasitic energy expended by the heating element 40 is minimized.

With any of the hydrogen-retention materials employed, a majority of the hydrogen may be released at the release temperature, but to completely release substantially all of the hydrogen, the temperature may need to be elevated to a higher, superheated release temperature. As an example, with doped sodium-aluminum hydride, approximately 70% of the hydrogen stored may be released by the by-product heat routed from the fuel cell stack 12, which operates at approximately 80° C. To release the balance of the hydrogen, the hydride must be "superheated" to a superheated release temperature of approximately 150° C.

Superheating the hydrogen-retention material may be accomplished by including a heat generator 42 within a superheater coolant loop 44, and isolating coolant within this loop so that the heat generator may heat it. To isolate the superheater coolant loop 44 from the balance of the coolant flow, a bypass valve 46 is interposed between the storage tank 22 and the radiator 26. Further, a secondary pump 48 is included in the superheater coolant loop 44 to circulate the superheated coolant. Therefore, the superheater coolant loop 44 includes the coolant-distribution valve 34, the storage tank 22, the bypass valve 46, the secondary pump 48, and the heat generator 42.

The heat generator 42 may operate as a catalytic reactor where unconsumed hydrogen is exhausted by the anode of the fuel cell stack 12 and is routed through hydrogen exhaust line 19 to the heat generator for catalytic combustion therein. Additionally, nitrogen and unconsumed oxygen exhausted by the cathode are routed to the heat generator 42 in the cathode exhaust line 21. The combustion reaction in the heat generator 42 generates thermal energy which may be transferred to the storage tank 22 via the superheater coolant loop 44. Including the heat generator 42 in the ECE 10 allows substantially all of the hydrogen stored in the hydrogen-retention material to be utilized. The heat generator 42 is an efficient alternative to generating heat electrically.

To replenish the supply of hydrogen stored in the storage tank 22, the present invention is directed to refueling apparatus 49 interfacing with both the vehicle and the refueling station. Focusing first on the vehicle side in FIG. 2, a fuel fill door 50 concealing a fuel fill pocket 52 is present, which is accessible to an operator on the exterior of the vehicle. The fuel fill door 50 is generally closed and locked to prevent access to the fuel fill pocket 52, but when unlocked, it opens to allow access to the pocket as shown in phantom in FIG. 2.

Figure 2:
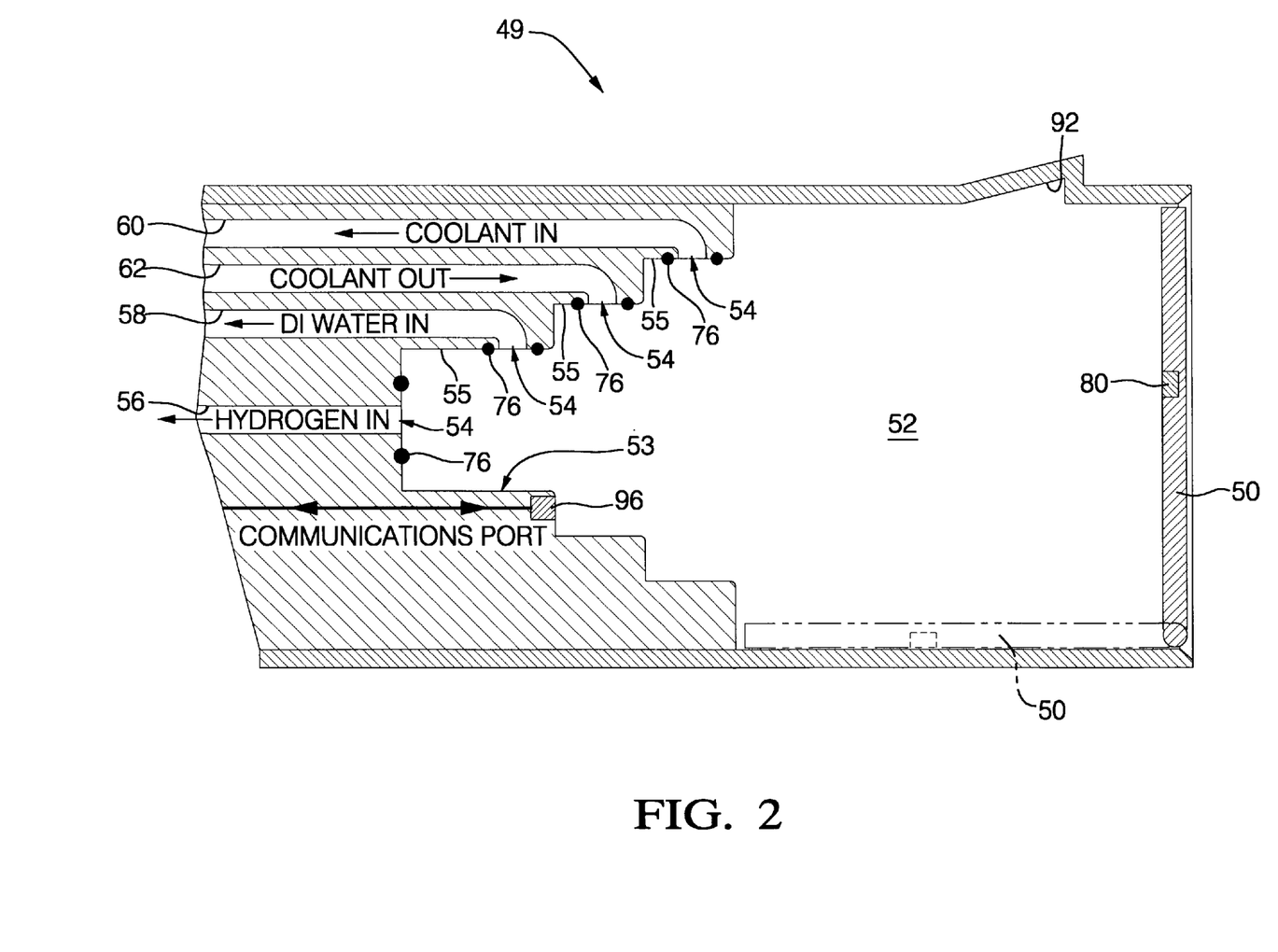
FIG. 2 is a schematic, sectional side view of a fuel fill pocket of the present invention.

The fuel fill pocket 52 has an interior end 53, which includes one or more openings 54 into pocket passages to the ECE 10. If more than one pocket passage is employed, the interior end 53 may be comprised of annular tiers 55, where each tier has an opening 54 for a pocket passage.

As shown in FIG. 2, one of the pocket passages is a hydrogen refueling line 56 which extends from the fuel fill pocket 52 to the storage tank 22. A second passage, which may be included, is a de-ionized water refilling line 58 extending from the fuel fill pocket 52 to a de-ionized water reservoir, not shown, in the ECE 10.

Third and fourth pocket passages may be dedicated coolant inlet and outlet lines 60 and 62 respectively, where the coolant inlet line 60 extends from the fuel fill pocket 52 to the storage tank 22, and the coolant outlet line 62 extends from the storage tank to the fuel fill pocket. This provides the capability for circulating pre-refueling coolant through the storage tank 22 to reduce the storage tank temperature. This cooling may be needed in order to regenerate the hydrogen-retention material with hydrogen, as the material must be at its hydrogen-storage temperature. In some instances the hydrogen-storage temperature may be about 20° C., and therefore either the operator must wait until the storage tank 22 has cooled before refueling with hydrogen or the cooling may be accelerated by circulating pre-refueling coolant therethrough.

Figure 3:
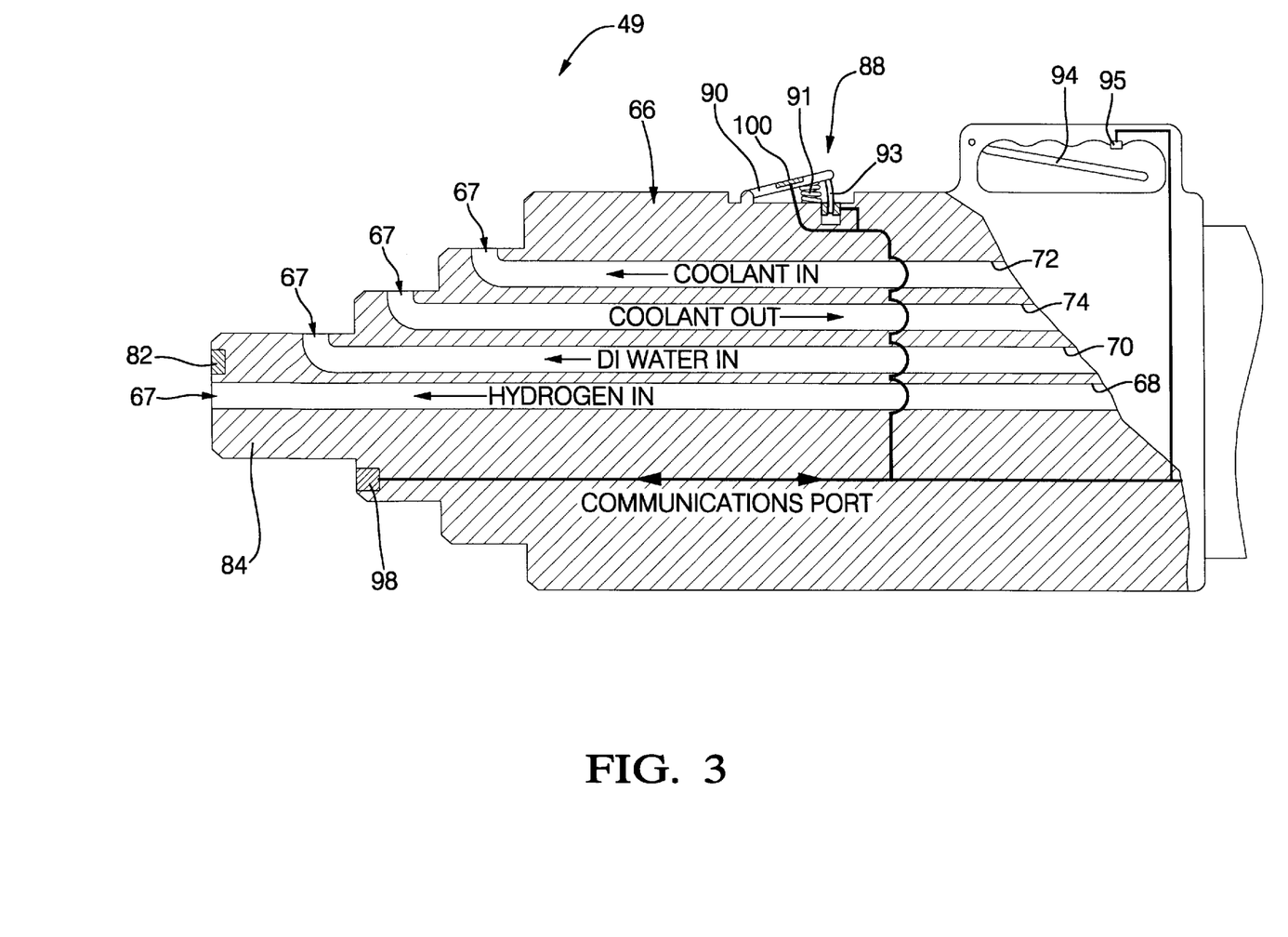
FIG. 3 is a schematic, sectional side view of a refilling nozzle to be used in conjunction with the fuel fill pocket of FIG. 2.
Figure 4:
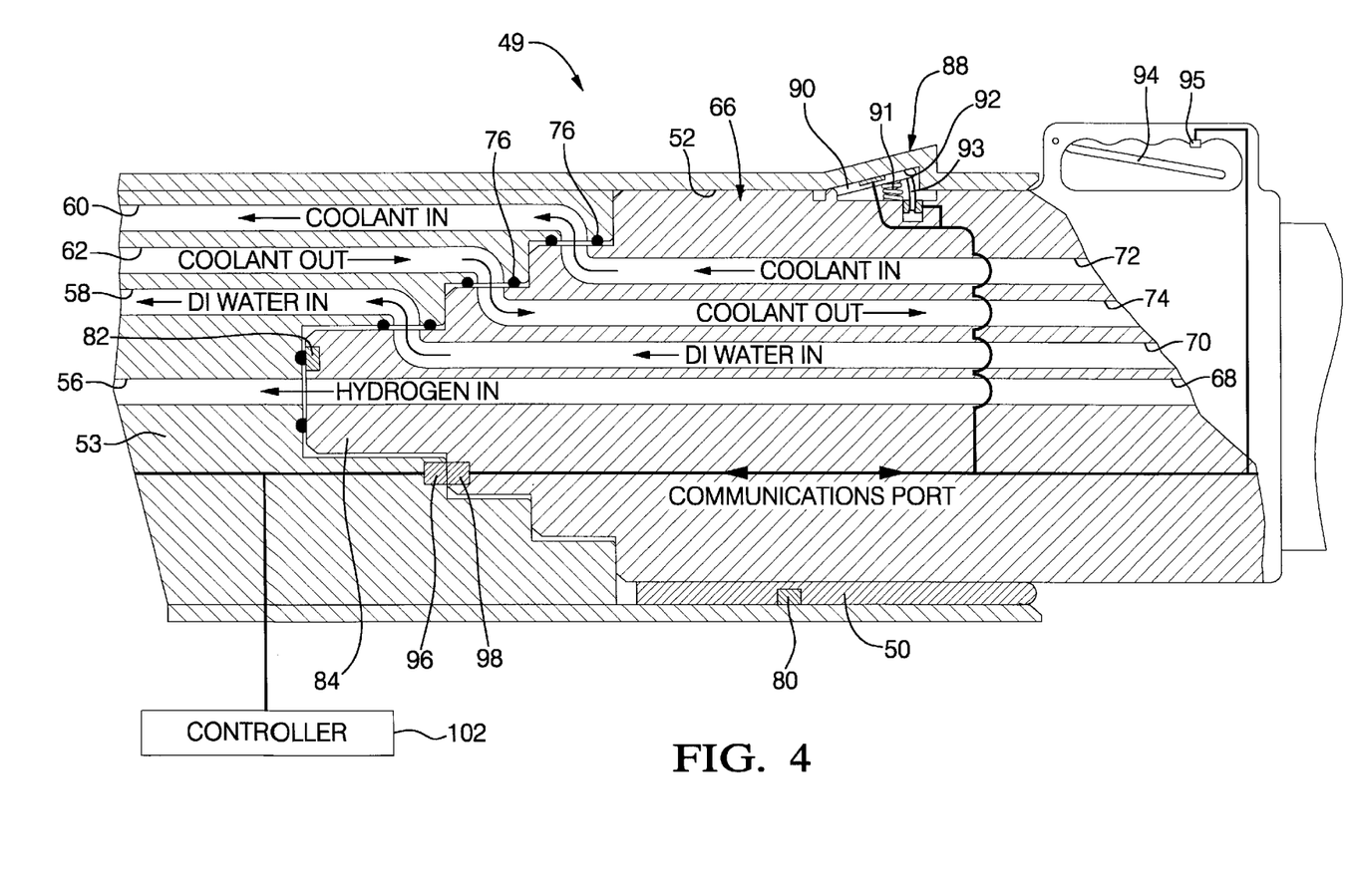
FIG. 4 is a schematic, sectional side view of the refilling nozzle interlocked with the fuel fill pocket during operation.

At the refueling station, a nozzle 66 in FIG. 3 is provided which is slideably receivable within the fuel fill pocket 52 as shown in FIG. 4. The nozzle 66 has nozzle openings 67 to nozzle passages, which correspond to complementary pocket passages in the fill pocket 52 for transferring medium therebetween. For example, the nozzle 66 includes: a hydrogen input line 68 to feed hydrogen to the pocket hydrogen refueling line 56; a de-ionized water input line 70 to feed de-ionized water to the de-ionized water refilling line 58; a nozzle coolant input line 72 to feed pre-refueling coolant to the pocket coolant inlet line 60; and a nozzle coolant output line 74 to receive pre-refueling coolant from the pocket coolant outlet line 62. Seals 76 such as o-rings are included at the interface of nozzle openings 67 and pocket openings 54 for sealing the nozzle-to-pocket interface to prevent leakage between complementary passages. The seals 76 are preferably located about the pocket openings 54 to prevent contamination.

The fuel fill door 50 has an unlocking feature 80 which operates in conjunction with a companion unlocking feature 82 on the nozzle 66 so that the fill door only unlocks for the nozzle. This safety feature prevents contamination of the pocket passages to the ECE 10. The fill door unlocking feature 80 may take many forms. One is to include a door release on the inside of the fill door 50 operating in conjunction with the companion unlocking feature 82, such as a magnet on the insertion end 84 of the nozzle 66, which unlocks the fill door upon contact of the nozzle on the outside of the fill door. The door unlocking feature 80 may also take the form of a receiver on the fill door 50 which receives a signal transmitted by the companion unlocking feature 82, such as a transmitter on the insertion end 84 of the nozzle 66. The transmission distance would preferably be small so that the nozzle 66 would have to be closely adjacent to the fill door 50 before the signal would be received to unlock the door. The transmitting signal may be continuously transmitted by the nozzle unlocking feature 82 or may be initiated by the operator. There are many ways to initiate the signal such as by requiring the operator to enter a pin code or to swipe a credit card through the gas pump at the refueling station.

Figure 5:
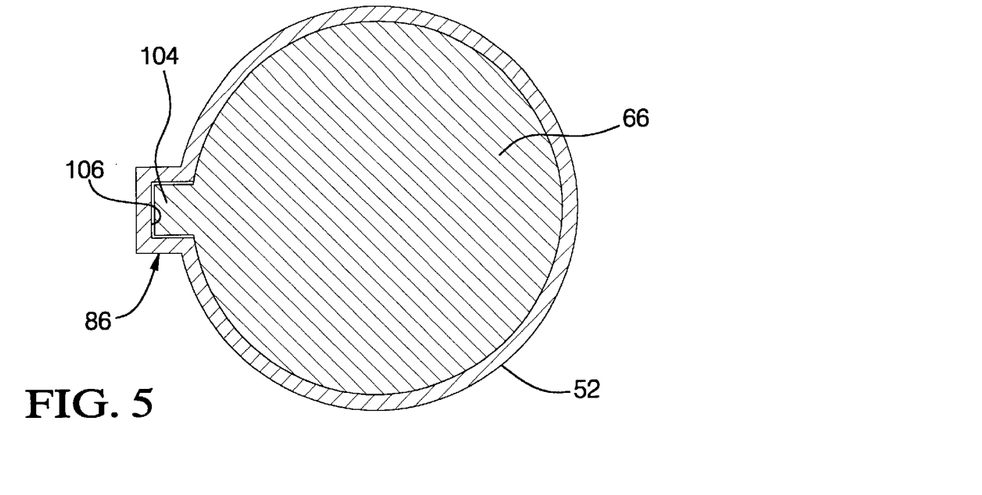
FIG. 5 is a schematic, sectional end view of FIG. 4.
Figure 6:
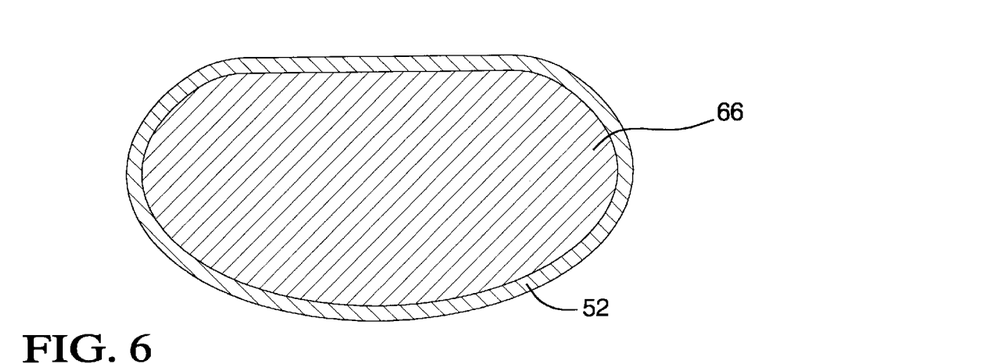
FIG. 6 is a second alternative to the cross sections of FIG. 5.
Figure 7:
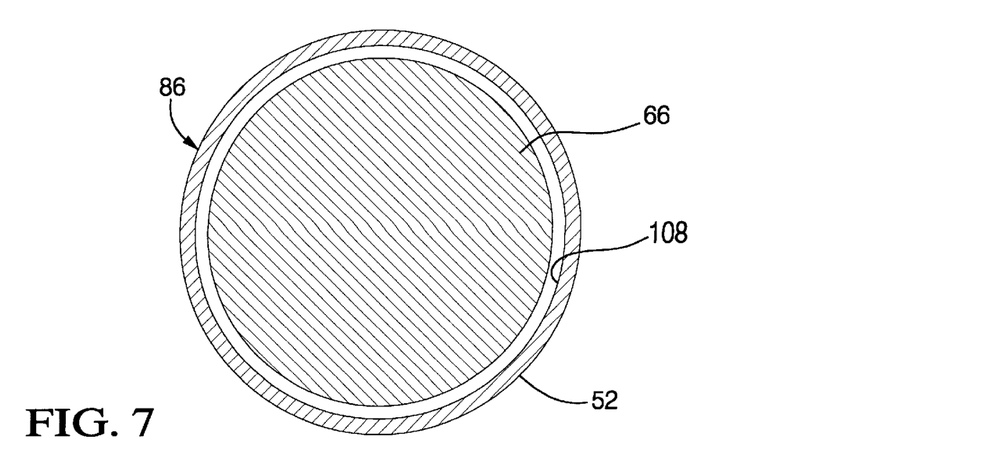
FIG. 7 is a third alternative to the cross sections of FIG. 5.

To ensure proper flow communication between complementary nozzle and pocket passages, a flow communication means 86 is provided for the refueling apparatus 49. Several alternative embodiments are shown in FIGS. 5–7. One alternative flow communication means 86 is for the nozzle 66 and the fuel fill pocket 52 to have concentric, symmetric cross sections where the nozzle also has a longitudinal key 104 receivable in a longitudinal slot 106 in the fill pocket. This configuration is shown in FIG. 5, but similarly the key could extend radially inward from the pocket with the aligning slot in the nozzle. The key 104 and slot 106 limit the insertion orientation of the nozzle 66 relative to the fuel fill pocket 52, which results in the nozzle passages aligning with, and therefore being in flow communication with, the pocket passages.

In FIG. 6, the flow communication means is accomplished by a non-symmetric nozzle cross section with a complementary, non-symmetric fuel fill pocket cross section. Similar to FIG. 5, this flow communication means limits the insertion orientation of the nozzle 66 relative to the fuel fill pocket 52, which results in the nozzle passages aligning with, and therefore being in flow communication with, the pocket passages.

So that the nozzle 66 may be inserted in any radial orientation without concern of physical alignment of the nozzle in the fuel fill pocket 52, the nozzle 66 and the fuel fill pocket 52 may have concentric, symmetric cross sections. Therefore to ensure flow communication between complementary nozzle and pocket passages, an annular connecting passage 108 is provided about the nozzle outer circumference as shown in FIG. 7. Alternatively the annular connecting passage may be about the inner circumference of the pocket. The annular connecting passage 108 acts as a buffer so that the operator does not have to physically align the nozzle in the fuel fill pocket before insertion, while still providing flow communication between complementary nozzle and pocket passages.

The refueling apparatus 49 includes an interlocking means 88 for securing the nozzle 66 in the fuel fill pocket 52 before hydrogen flow may begin through the nozzle. This interlocking means 88 ensures that the nozzle 66 is fully inserted and the nozzle passages are closely adjacent with the associated pocket passages when the interlocking means is properly engaged. The interlocking means 88 may take many forms. For example as shown in FIG. 4, a spring-loaded latch 90 on the nozzle 66 is depressed while longitudinally inserting the nozzle in the pocket 52 and snaps into a recess 92 in the pocket upon full engagement of the nozzle in the pocket. The latch 90 may be released by actuating a plunger 93 against the force of the spring 91. Likewise, the interlocking means 88 may comprise a spring-loaded latch on the nozzle which snaps into a radial recess in the pocket upon turning the nozzle a quarter turn so that the nozzle can not be inadvertently removed. With any of the interlocking means 88 employed, it is preferred that it only be released upon an electronic signal so that this interlocking means may be controlled. An interlocking sensor 100 is included to sense when the interlocking means 88 is engaged properly.

The nozzle 66 also includes a finger-actuated lever 94, similar to current fuel fill nozzles, which the operator depresses to signal that the operator wants to initiate flow through the nozzle. Releasing the finger-actuated lever 94 signals that the operator wants to stop flow through the nozzle 66. A refueling sensor 95 may be used to sense when the finger-actuated lever 94 is depressed.

The fuel fill pocket 52 and the nozzle 66 each have a mating communication port 96 and 98 respectively, which send and receive electronic data therebetween and to a controller 102 for controlling the operation of refueling the ECE 10. The controller 102 monitors such things as temperature and pressure in the storage tank 22, pressure in the pocket passages and nozzle passages, whether the nozzle 66 is properly interlocked with the pocket 52, and whether the finger-actuated lever 94 is depressed.

The method of refueling an ECE 10 with the above refueling apparatus 49 will now be described. To initiate the refueling process, the insertion end 84 of the nozzle 66 is placed adjacent to the fill door 50 thereby actuating the fill door unlocking feature 80 with the companion unlocking feature 82. Upon unlocking the fill door 50, the nozzle 66 is inserted in the fuel fill pocket 52 using the flow communication means 86 to ensure flow communication between nozzle passages and pocket passages. Once the nozzle 66 is completely inserted in the fuel fill pocket 52, the interlocking means 88 is engaged to securely retain the nozzle 66 within the fill pocket 52. The controller 102 may verify that the interlocking means 88 is properly engaged via the interlocking sensor 100. The operator depresses the finger-actuated lever 94 signaling through the refueling sensor 95 to the controller 102 that the operator wants to begin refueling.

Before the controller 102 initiates hydrogen flow between the nozzle 66 and the vehicle, the controller monitors the storage tank temperature and compares it with the reference hydrogen-storage temperature. If the storage tank temperature is above the hydrogen-storage temperature, then the controller 102 initiates pre-refueling coolant circulation from the nozzle coolant input line 72, into the pocket coolant inlet line 60. Pre-refueling coolant is circulated through the storage tank 22 and out the pocket coolant outlet line 62, to the nozzle coolant output line 74. This pre-refueling coolant circulation cools the hydrogen-retention material in preparation for hydrogen refueling.

Once the storage tank temperature is cooled to the hydrogen-storage temperature, the controller 102 turns off the flow of pre-refueling coolant through the nozzle 66. The controller 102 then begins the flow of hydrogen from the nozzle hydrogen input line 68, into the pocket hydrogen refueling line 56. The hydrogen is delivered to the storage tank 22 where the hydrogen-retention material takes-up and stores the hydrogen. The controller 102 monitors the pressure in the storage tank and compares it against a set value which indicates the tank is "full", meaning the hydrogen-retention material has stored all the hydrogen it is capable of storing. Once the storage tank 22 is full, the controller 102 stops the flow of hydrogen through the nozzle 66. This occurs even if the operator has the finger-actuated lever 94 depressed for refueling.

When the controller 102 turns off hydrogen flow through the nozzle 66 because the storage tank 22 is full or because the operator released the finger-actuated lever 94 prior to this point, the controller 102 monitors the coolant pressure in the pocket coolant inlet line 60 to verify it is below a minimum set pressure, likewise the controller monitors the hydrogen pressure in the pocket hydrogen refueling line 56 to verify it is below a minimum set pressure. This ensures that there is no back flow of either hydrogen or coolant when the nozzle 66 is removed from the pocket 52. The controller 102 also monitors the pressures in the nozzle hydrogen input line 68 and nozzle coolant input and output lines 72,74 and verifies that the pressures have dropped below a predetermined minimum level before the nozzle 66 is removed. The controller 102 then electronically signals the release of the interlocking means 88 once all pressures in the lines are at safe levels. This allows the operator to remove the nozzle 66 to complete the refueling process.

Figure 8:
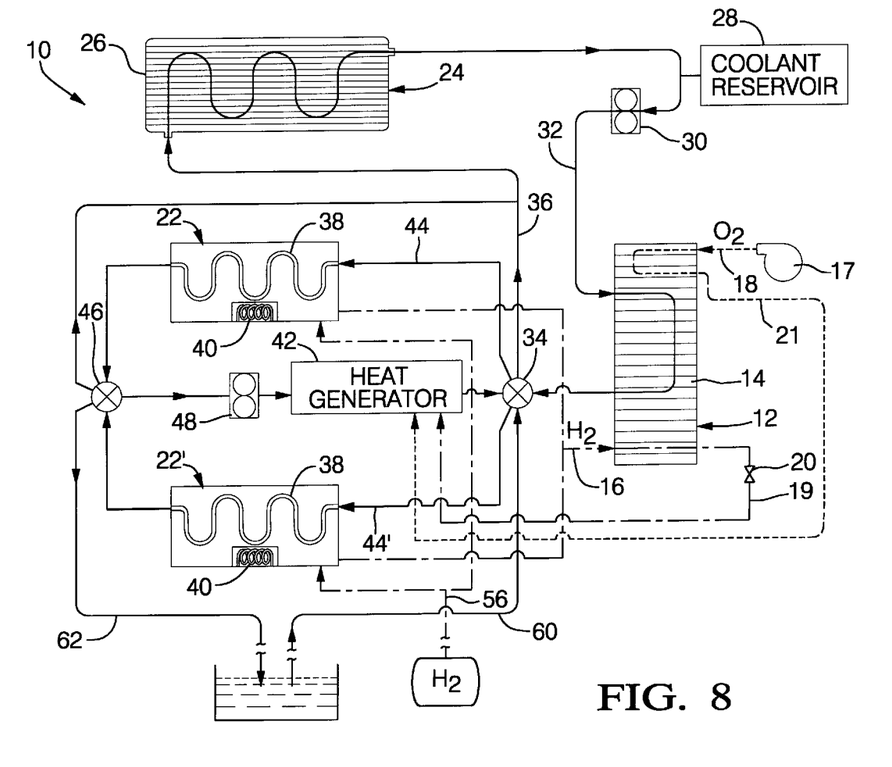
FIG. 8 is a schematic illustration of a second electrochemical engine to be refueled using the present invention.

To further provide packaging benefits and cooling efficiencies, the ECE 10 could include two or more storage tanks, referred to as first storage tank 22 and second storage tank 22', as needed to fit the packaging space and volume requirements. Such an ECE 10 is illustrated in FIG. 8 with like components designated by the same reference numbers as in FIG. 1. In this case the process is similar to that described above. The controller 102 verifies that the nozzle 66 is properly inserted and the interlocking means 88 engaged. It then monitors the tank temperature of both storage tanks 22,22'. If the storage tank temperature of one tank, say the first storage tank 22 for example, is above the hydrogen-storage temperature, then the controller 102 initiates pre-refueling coolant circulation from the nozzle coolant input line 72, into the pocket coolant inlet line 60, through first storage tank 22 and out the pocket coolant outlet line 62, to the nozzle coolant output line 74. Circulation is continued until the first storage tank 22 is cooled to the hydrogen-storage temperature. Concurrently, if the temperature of second storage tank 22' is at the hydrogen-storage temperature, then the controller 102 may begin refueling that second tank 22' with hydrogen while the first tank 22 is being cooled by pre-refueling coolant circulation. But if the temperature of second storage tank 22' is above the hydrogen-storage temperature, the controller 102 circulates pre-refueling coolant therethrough once the first tank 22 is sufficiently cooled. By refilling one tank that is properly cooled with hydrogen while simultaneously circulating pre-refueling coolant through a second tank, the present invention provides an efficient process for quickly cooling and refilling the storage tanks.

If hydrogen is stored in its gaseous state in the storage tank 22 of FIG. 1, then hydrogen-retention material is not utilized. Likewise, there is no need for pre-refueling coolant to pass through the storage tank 22, nor is there a need for a heat generator, as heat is not needed to release hydrogen. Since the present invention is for a method and apparatus for refueling, it is still applicable to an ECE, which stores gaseous hydrogen on-board the vehicle, simply by excluding the provisions for pre-refueling coolant circulation.

The refueling apparatus of the present invention provides an efficient and controllable method for refueling an ECE with hydrogen gas. As the infrastructure is updated to reflect refueling stations, which provide hydrogen gas for ECE vehicles, adding the capability to circulate pre-refueling coolant through the vehicle to cool it prior to refilling may also be advantageous.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A refueling apparatus for refueling a vehicle powered by an electrochemical engine, comprising:

a fuel fill pocket accessible to the exterior of the vehicle and having an interior end with an opening to a hydrogen refueling line, said hydrogen refueling line extends between said fuel fill pocket and a storage tank in the engine, a fuel fill door concealing said fuel fill pocket when closed and operable to open for access to said fuel fill pocket, a nozzle operably connected to a refueling station and which is slideably receivable within said fuel fill pocket and having a hydrogen input line, said refueling apparatus further comprising a flow communication means to ensure said hydrogen input line is in flow communication with said hydrogen refueling line for transferring hydrogen therebetween, and mating communication ports in said nozzle and said fuel fill pocket operable to send and receive electronic signals therebetween and to a controller for controlling the operation of refueling.

2. A refueling apparatus, as defined in claim 1, wherein said nozzle further includes a de-ionized water input line and said fuel fill pocket further includes a de-ionized water refilling line for delivering de-ionized water from the refueling station to a de-ionized water reservoir in the engine.

3. A refueling apparatus, as defined in claim 1, wherein said nozzle further includes a nozzle coolant input line and a nozzle coolant output line and said pocket further includes a coolant inlet line and a coolant outlet line for circulating cooled pre-refueling coolant from the refueling station through said storage tank in the engine and back to the refueling station.

4. A refueling apparatus, as defined in claim 1, wherein said fuel fill door further comprises an unlocking feature and said nozzle further comprises a companion unlocking feature, which operate in conjunction by unlocking said fuel fill door when said nozzle is placed adjacent to said fill door to allow said nozzle to be inserted in said fuel fill pocket.

5. A refueling apparatus, as defined in claim 4, wherein said fuel fill door unlocking feature is a receiver and said nozzle companion unlocking feature is a transmitter which transmits a signal to said receiver to unlock said fuel fill door when said nozzle is adjacent thereto.

6. A refueling apparatus, as defined in claim 1, further comprising an interlocking means for securing said nozzle in said fuel fill pocket when said nozzle is fully inserted, and an interlocking sensor signaling to said controller when said interlocking means is engaged.

7. A refueling apparatus, as defined in claim 6, wherein said interlocking means is releasable upon an electronic signal from said controller.

8. A refueling apparatus, as defined in claim 1, wherein said flow communication means comprises said nozzle and said fuel fill pocket having concentric, symmetric cross sections and a key and a slot limiting insertion orientation of said nozzle relative to said fuel fill pocket.

9. A refueling apparatus, as defined in claim 1, wherein said flow communication means comprises said nozzle having a non-symmetric cross section and said fuel fill pocket having a complementary non-symmetric cross-section to limit insertion orientation of said nozzle relative to said fuel fill pocket.

10. A refueling apparatus, as defined in claim 1, wherein said flow communication means comprises said nozzle and said fuel fill pocket having concentric, symmetric cross sections and an annular connecting passage about the outer circumference of said nozzle to ensure flow communication between said hydrogen input line and said hydrogen refueling line regardless of insertion orientation of said nozzle in said fuel fill pocket.

11. A refueling apparatus, as defined in claim 1, wherein said nozzle further includes a finger-actuated lever which upon depressing said lever indicates desire for transfer of hydrogen between said nozzle and said fuel fill pocket.

12. A refueling apparatus for refueling a vehicle powered by an electrochemical engine, comprising:

a fuel fill pocket accessible to the exterior of the vehicle and having an interior end with pocket passages for refueling a storage tank in the engine and circulating cooled pre-refueling coolant from a refueling station through said storage tank and back to the refueling station, a fuel fill door concealing said fuel fill pocket when closed and having an unlocking feature, a nozzle operably connected to the refueling station and slideably receivable within said fuel fill pocket and having nozzle passages complementary to said pocket passages, and a companion unlocking feature, which operates in conjunction with said fuel fill door unlocking feature by unlocking said fuel fill door when said nozzle is placed adjacent to said fuel fill door, a flow communication means to ensure said nozzle passages are in flow communication with said pocket passages, an interlocking means for securing said nozzle in said fuel fill pocket when said nozzle is fully inserted, and mating communication ports in said nozzle and said fuel fill pocket operable to send and receive electronic signals therebetween and to a controller for controlling the operation of refueling.

13. A method for refueling an electrochemical engine for a vehicle, comprising the steps of:

unlocking a fuel fill door to reveal a fuel fill pocket on the vehicle;

inserting a nozzle in said fuel fill pocket;

engaging an interlocking means to secure said nozzle in said fuel fill pocket;

verifying electronically said interlocking means is engaged; initiating hydrogen flow from a nozzle passage in said nozzle, through a pocket passage in said fuel fill pocket, to a storage tank on the vehicle; after completing hydrogen flow, verifying pressure in said nozzle passage and said pocket passage are below a minimum set pressure; and then releasing electronically said interlocking means to remove said nozzle from said fuel fill pocket.

14. A method for refueling an electrochemical engine for a vehicle, as defined in claim 13, further comprising the steps of:

checking the temperature of said storage tank prior to initiating hydrogen flow; and if the storage tank temperature is above a hydrogen-storage temperature, initiating pre-refueling coolant circulation through a nozzle coolant inlet line, a pocket coolant inlet line, said storage tank, a pocket coolant outlet line, and a nozzle coolant outlet line, prior to initiating hydrogen flow.

* * * * *